G. W. MANN.
AIRSHIP.
APPLICATION FILED DEC. 8, 1917.
1,262,535.
Patented Apr. 9, 1918.
3 SHEETS—SHEET 3.
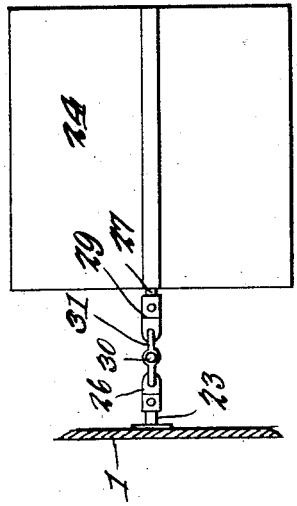
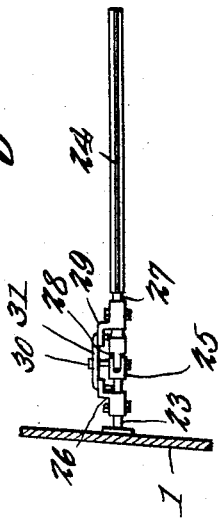
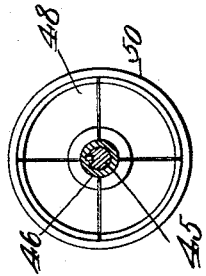
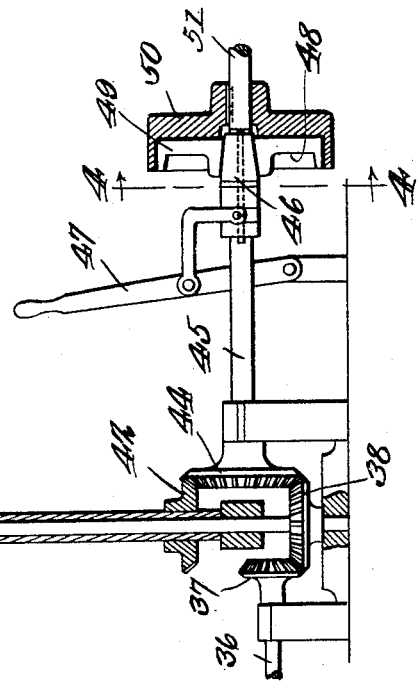
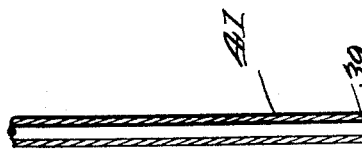
G. W. Mann, Inventor,
Witness
By C. A. Snow & Co.
Attorneys.

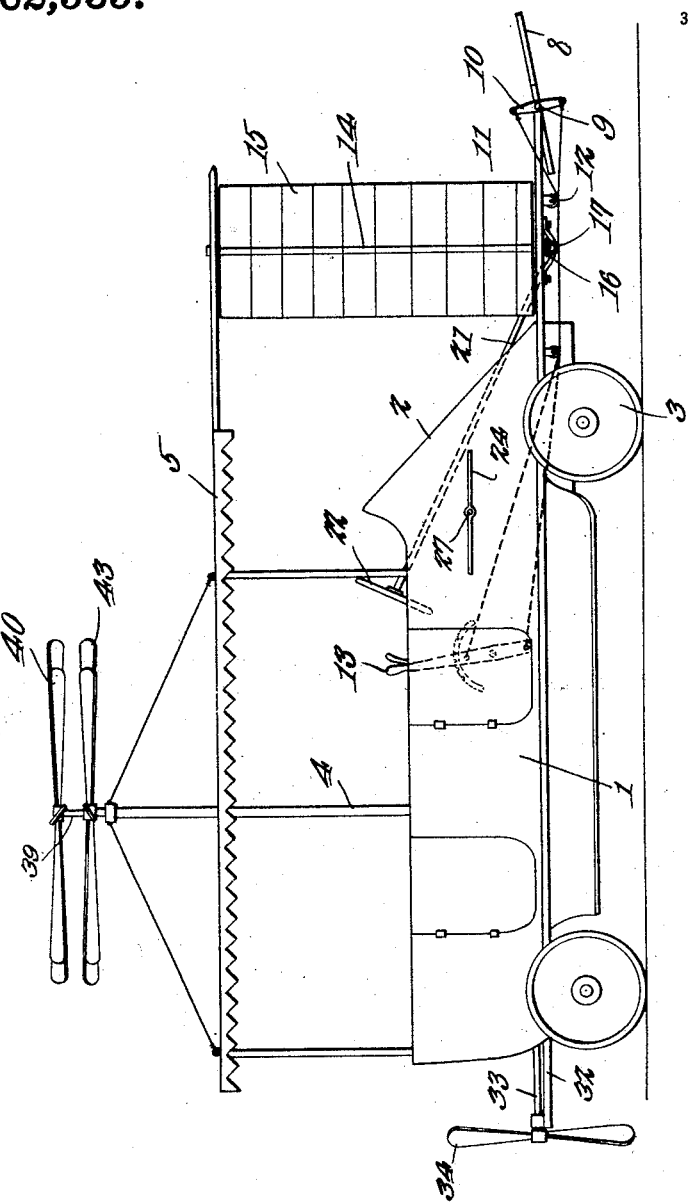

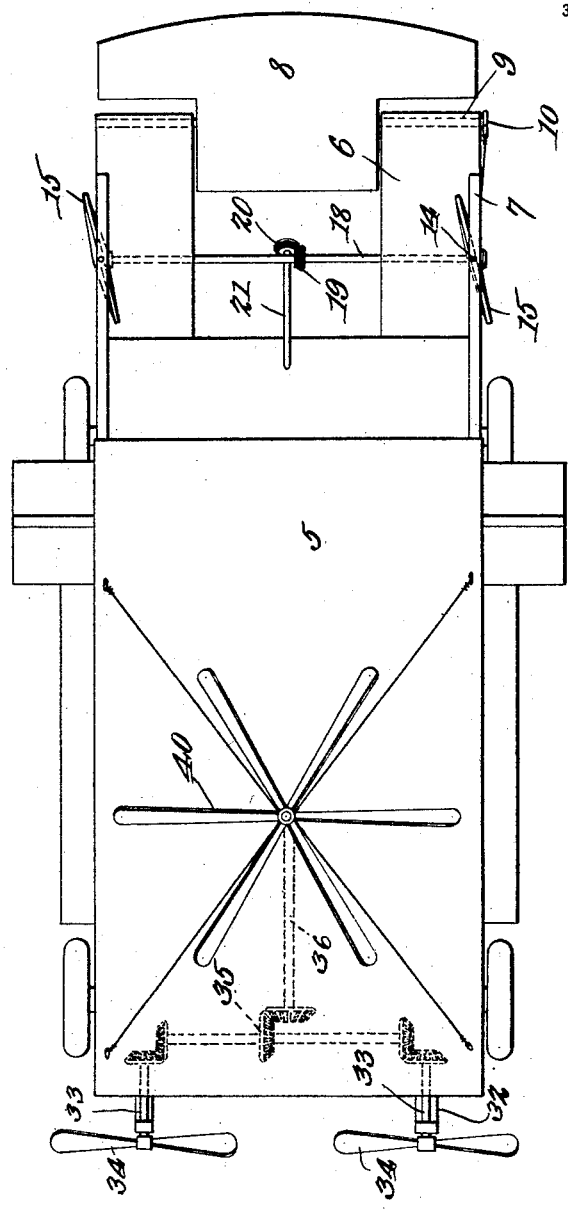

UNITED STATES PATENT OFFICE.

GEORGE W. MANN, OF PIERCE CITY, MISSOURI, ASSIGNOR OF ONE-HALF TO EMMERT C. BLOCK, OF SARCOXIE, MISSOURI.

AIRSHIP.

1,262,535. Specification of Letters Patent. Patented Apr. 9, 1918.

Application filed December 8, 1917. Serial No. 206,223.

*To all whom it may concern:*

Be it known that I, GEORGE W. MANN, a citizen of the United States, residing at Pierce City, in the county of Lawrence and State of Missouri, have invented a new and useful Airship, of which the following is a specification.

This invention relates to new and useful improvements in airships, one of its objects being to provide an airship so constructed as to be capable of use as an ordinary motor vehicle, there being means under the control of the driver whereby the machine can be readily guided under all conditions and caused to travel along the ground and to ascend and descend at will.

A further object is to provide a machine of this character which can be driven readily over ordinary roads, there being combined with the machine a novel arrangement of planes adapted to be positioned back against the sides of the car of the machine when it is desired to propel the machine along a narrow space, such as a road.

A still further object is to provide a machine having a cover for the body portion thereof and which also serves as a sustaining plane when the machine is in flight.

Another object is to combine with the machine a helicopter to assist in maintaining the machine at a desired elevation.

With the foregoing and other objects in view which will appear as the description proceeds, the invention consists of certain novel details of construction and combinations of parts which will be hereinafter more fully described and pointed out in the claim, it being understood that various changes may be made in the construction and arrangements of the parts without departing from the scope of the appended claim.

In the accompanying drawings the preferred form of the invention has been shown.

In said drawings—

Figure 1 is a side elevation of an airship embodying the present improvements.

Fig. 2 is a plan view thereof.

Fig. 3 is a view partly in elevation and partly in section of the mechanism employed for transmitting motion to the helicopter wheel.

Fig. 4 is an enlarged section on line 4—4, Fig. 3.

Fig. 5 is a plan view of one of the foldable side wings.

Fig. 6 is a front elevation thereof.

Referring to the figures by characters of reference 1 designates a vehicle body similar to that of an automobile and the front end of the body is inclined upwardly and rearwardly, as shown at 2, there being supporting wheels 3 on which the body is mounted so as to be capable of traveling along the ground. Struts 4 are extended upwardly from the body and serve to support a cover which is so constructed and arranged as to constitute a sustaining plane 5. The bottom of the body 1 is flat, thus to constitute a sustaining plane and extending forwardly from this flat bottom at the sides thereof are small front sustaining planes 6 overhung by forwardly extending arms carried by the cover 5 and which arms have been indicated at 7.

Supported between the front planes 6 is a tilting plane 8 so shaped as to extend transversely in front of the planes 6, the shaft 9 of this plane being provided with oppositely extending arms 10 to which are connected operating cords 11. These cords are extended rearwardly past guide sheaves 12 to an operating lever 13 located in the body 1 where it can be conveniently operated by the driver.

Mounted between the outer sides of the planes 6 and the front ends of the arms 7 are upstanding shafts 14 to which are secured vertical planes or rudders 15 disposed in parallel relation. Each of the shafts 14 is provided at its lower end with a gear 16 meshing at all times with a gear 17 secured to a transverse shaft 18 journaled under the planes 6. Another gear 19 is secured to the shaft 18 and meshes with a gear 20 secured to the forward end of a shaft 21 which extends rearwardly into the body and is provided with a hand wheel adapted to be operated by the driver. This wheel has been shown at 22.

Journaled within the sides of the body 1 is a shaft 23 to the end portions of which are connected side planes 24. These planes are so connected to the shaft that they can be tilted by rotating the shaft and the connections likewise permit the side planes to be swung inwardly against the sides of the car when they are not in use. Each connection includes a fork 25 fixedly connected to the shaft so as to rotate therewith and a bracket 26 is likewise fixedly attached to the shaft. The tiltable side plane 24 has a transverse shaft 27 extending laterally therebeyond and provided with a tongue 28 and a bracket 29. A pivot pin 30 is extended downwardly through a link 31 and serves to pivotally connect the tongue 28 to the fork 25, the ends of the link 31 being pivotally connected to the brackets 26 and 29. Thus it will be seen that as long as the link is engaged by the pin 30 and said pin is in engagement with tongue 28 and fork 25 the shaft 27 will be held in line with the shaft 23 and will move therewith. However, by removing the pin 30, the shaft 27 and the plane 24 connected thereto can be swung rearwardly and inwardly relative to the car, thus to bring the plane close to the car body and permit the car to travel in a narrow space.

Extending rearwardly from the body 1 are arms 32 on each of which is journaled a shaft 33 carrying a propeller 34. These shafts are adapted to be driven in any suitable manner, as by means of bevel gearing, indicated generally at 35, from a shaft 36 having a gear 37 meshing with a gear 38 secured to the lower portion of a vertical shaft 39. This shaft is mounted in the body 1 and extends upwardly through the top 5 and is provided at its upper end with an elevating wheel or helicopter 40. Mounted for rotation on the shaft 39 is a tubular shaft 41 provided near its lower end with a gear 42 and secured to this tubular shaft at its upper end is a lifting wheel or helicopter 43. The gear 42 meshes with a gear 44 secured to a shaft 45 and which gear also meshes with the gear 38 hereinbefore referred to. This gear is adapted to operate continuously during the actuation of the machine and the end of its shaft has a conical sleeve 46 feathered thereon. This sleeve is adapted to be shifted by a lever 47 or hand wheel and the tapered portion thereof is surrounded by the segmental members 48 of an expansible clutch 49. This clutch is located inside a drum 50 which is fixed to and rotates with the shaft 51 of the engine of the machine.

Under ordinary conditions the engine shaft 51 will rotate freely and the usual mechanism can be employed for propelling the machine over the ground. However, when it is desired to cause the machine to leave the ground, the lever 47 is shifted, thus to couple the shafts 45 and 51 and cause the propellers 34 and the wheels 40 and 43 to rotate. It is to be understood, of course, that before this operation is effected, the side planes are swung outwardly from the sides of the body 1 and locked by the pins 30. By tilting the planes 24 and the plane 8 the machine can be caused to ascend, this movement being assisted by the rotating wheels 40 and 43. The machine can be steered by the planes or rudders 15 and as the propellers are driving the machine forwardly, the flat bottom of the body and the flat cover 5 will act as sustaining planes.

What is claimed is:

An air ship including a wheel supported body having a flat bottom constituting a sustaining plane, a cover extending over the body and constituting a sustaining plane, a transverse shaft, side planes each having a transverse shaft, a link connecting each shaft of the side planes with the other transverse shaft, said planes being adapted to swing rearwardly and inwardly relative to the body and upon the link connections, and pivot pins removably engaging and connecting the shafts of the planes to the other transverse shaft, said pins engaging the links to hold them against movement and maintain all of the shafts in alinement.

In testimony that I claim the foregoing as my own, I have hereto affixed my signature in the presence of two witnesses.

GEORGE W. MANN.

Witnesses:
A. F. KEY,
C. A. RHEA.

Copies of this patent may be obtained for five cents each, by addressing the "Commissioner of Patents, Washington, D. C."